United States Patent [19]
Armo

[11] Patent Number: 6,032,569
[45] Date of Patent: Mar. 7, 2000

[54] LOCKING DEVICE FOR SECURING A PISTON TO A PISTON ROD

[75] Inventor: Sverker Armo, Eskilstuna, Sweden

[73] Assignee: Volvo Wheel Loaders AB, Eskilstuna, Sweden

[21] Appl. No.: 09/077,529

[22] PCT Filed: Dec. 2, 1996

[86] PCT No.: PCT/SE96/01584

§ 371 Date: May 29, 1998

§ 102(e) Date: May 29, 1998

[87] PCT Pub. No.: WO97/21946

PCT Pub. Date: Jun. 19, 1997

[30] Foreign Application Priority Data

Dec. 8, 1995 [SE] Sweden .................................. 9504397

[51] Int. Cl.[7] .................................................. F01B 29/00
[52] U.S. Cl. ................................ 92/128; 92/172; 92/256; 403/372; 403/375; 403/376
[58] Field of Search ............................. 92/128, 255, 256, 92/257, 172; 403/375, 372, 376

[56] References Cited

U.S. PATENT DOCUMENTS

| | | |
|---|---|---|
| 3,625,554 | 12/1971 | Mottais et al. . |
| 3,648,348 | 3/1972 | Freimuth ................................. 403/273 |
| 4,192,225 | 3/1980 | Moyer ..................................... 92/169.1 |
| 4,630,958 | 12/1986 | McCallister ............................. 403/257 |
| 4,771,678 | 9/1988 | Walker ..................................... 92/128 |
| 5,245,911 | 9/1993 | Yuda ........................................ 92/128 |

FOREIGN PATENT DOCUMENTS

| | | |
|---|---|---|
| 39 12 919 | 10/1990 | Germany . |
| 224207 | 7/1925 | United Kingdom . |
| 226190 | 9/1925 | United Kingdom . |

Primary Examiner—Thomas E. Denion
Attorney, Agent, or Firm—Young & Thompson

[57] ABSTRACT

For locking against rotation a piston on a piston rod, the piston having a peripheral groove and at least one radial through-hole to be positioned over a notch, a locking clip with a first straight end part and a curved part has a first end part extending through the radial hole in the piston and a part of the curved part of the locking clip rests in the peripheral groove when in a piston-locking position.

16 Claims, 2 Drawing Sheets

LOCKING DEVICE FOR SECURING A PISTON TO A PISTON ROD

BACKGROUND OF THE INVENTION

The invention concerns a device for locking a piston onto a piston rod, for example for a hydraulic or pneumatic cylinder. The invention also concerns a locking clip and a piston intended to be locked onto a piston rod by the locking clip.

There are a number of known solutions to how a piston can be locked onto a piston rod for a hydraulic or pneumatic cylinder.

DESCRIPTION OF THE RELATED ART

A known example is when the piston is threaded onto the end of the piston rod after which a hole is bored radially through the piston and the piston rod. Subsequently, a locking means in the shape of a cylindrical pin is pressed into the hole, whereby relative rotation between the piston and the piston rod is prevented.

In another known example a two-piece piston is used where both parts of the piston are threaded onto a piston rod. The outer part is provided with a number of axially directed screws which are screwed against the other part so that an axially directed force occurs in the threaded joint between the piston rod and the piston parts. In this way a firm locking of the piston parts onto the piston rod is achieved.

When changing the packing in a cylinder end through which the piston rod passes, the piston, because of the design of the piston rod, must be dismantled from the piston rod. In big cylinders this dismantling must sometimes be performed in uncomfortable circumstances, e.g. in the field, wherefore a complicated locking device which consists of a number of small parts is unsatisfactory.

Large forces and load changes act between the piston and the piston rod. Because of the elasticity of the material of the piston and the piston rod, the large forces can produce a relative movement between the piston and the piston rod in the axial direction. If the locking means of the locking device then takes up the whole of the force which acts between the piston and the piston rod, the locking device will be destroyed because of fatigue.

SUMMARY OF THE INVENTION

An object of the present invention is to produce a cheaper, better and more secure device for locking against rotation a piston onto a piston rod, which device consists of only a small number of components.

A further object is to achieve a device for locking a piston onto a piston rod, which device permits assembly and disassembly with simple tools and manipulations.

Yet another object is to achieve a device for locking a piston onto a piston rod which device is designed to cope with large forces and load changes.

These objects are achieved through the piston being equipped with at least one radial through-hole which is intended to be positioned over a groove in the piston rod and by a locking clip, which comprises a first straight end part and a curved part, being intended to have its first end part extend through the radial hole in the piston and into the groove in the piston rod, in addition to which the piston is provided with a peripheral groove in which a part of the curved part of the locking clip is intended to rest in a piston-locking position.

Owing to the curved part of the locking clip describes an arc which is less than 180° a simple mounting of the locking clip on the piston and the piston rod is made possible.

The piston comprises a circular body with an axial through-hole for the introduction of a piston rod and a circumferential groove which is in the same radial plane on the piston as the radial hole.

BRIEF DESCRIPTION OF THE DRAWINGS

The invention will be described below in more detail by means of an embodiment with reference to the appended drawings, in which.

DESCRIPTION OF THE PREFERRED EMBODIMENTS

Figure 2:
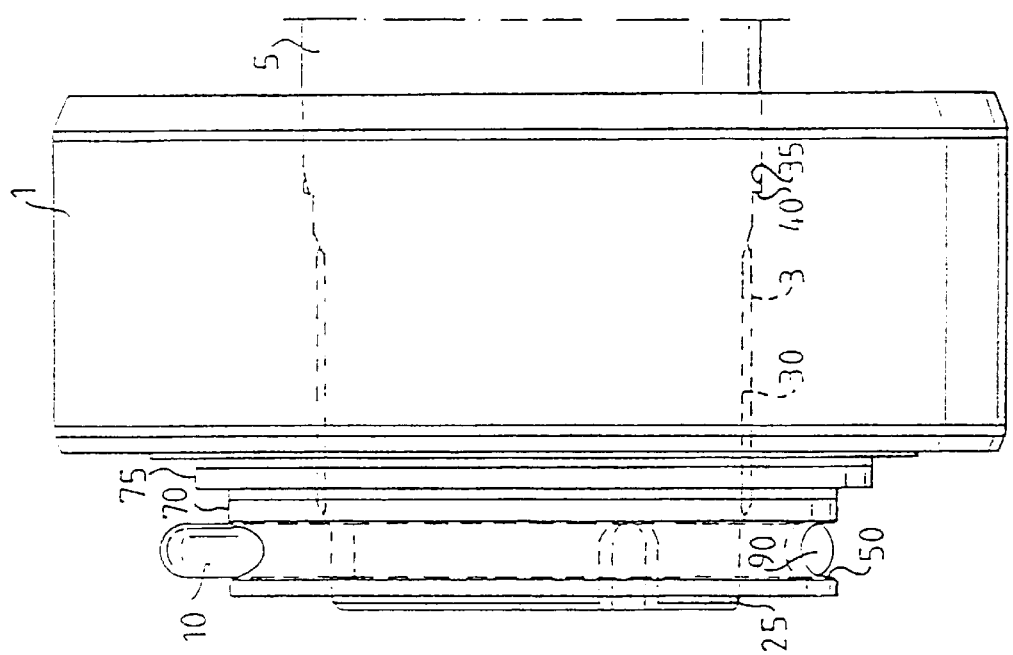
FIG. 2 shows a lateral view of the device in FIG. 1.
Figure 1:
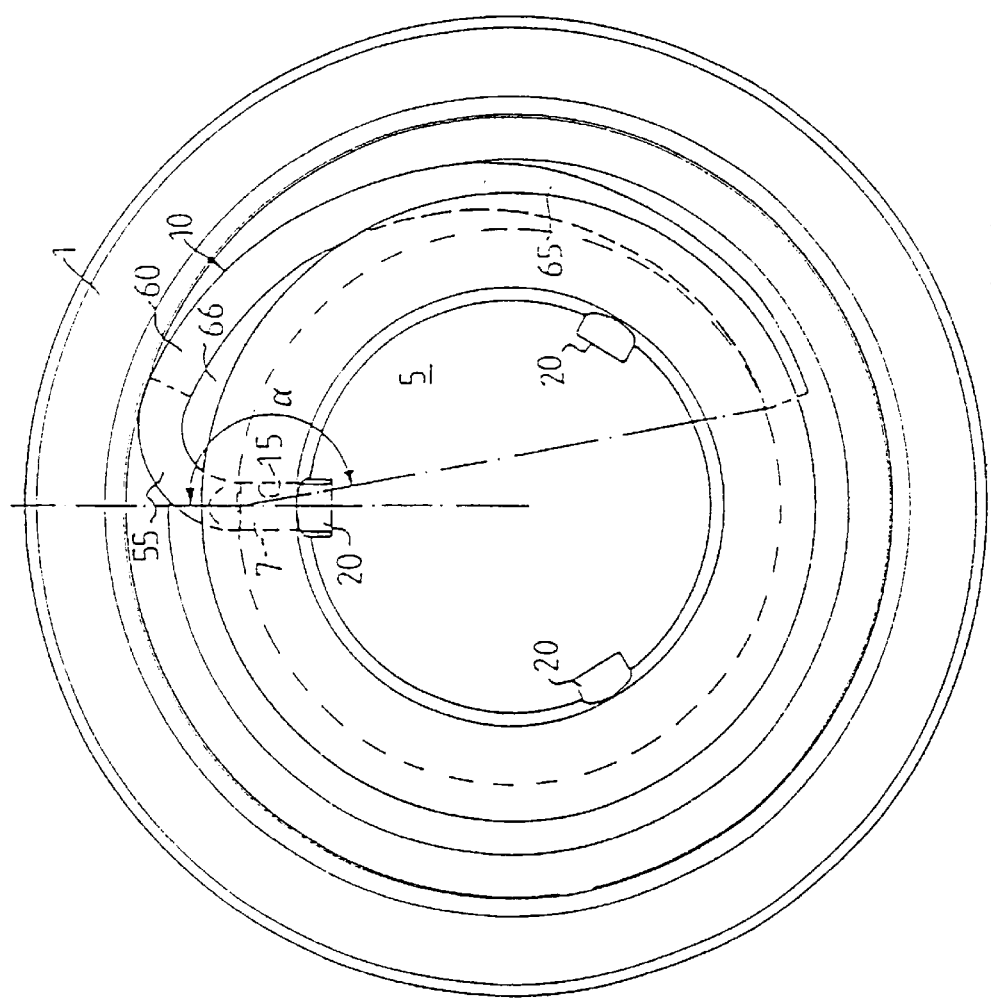
FIG. 1 shows an end view of a piston which is mounted on a piston rod and fastened by means of a first embodiment of a locking clip according to the invention.

FIGS. 1 and 2 show a piston 1 which is equipped with a threaded, axial through-hole 3 and which is screwed onto a threaded part of a piston rod 5. In order to prevent the piston 1 from loosening, i.e. unscrewing, from the piston rod 5, a first end part 7 of a locking clip 10 is introduced into a radial through-hole 15 in the piston 1. The first end part 7 of the locking clip 10 is straight and extends through the radial hole 15 in the piston 1 and into one of three notches 20 which are formed in the piston rod 5. The notches 20 are preferably shaped like elongated grooves which extend in the axial direction in an end part 25 of the piston rod 5.

The notches 20 are evenly distributed around the periphery of the end part 25 in order to cooperate and coincide with the radially directed hole 15 in the piston in a desired position between the piston and the piston rod. Owing to the notches 20 being shaped as axially directed longitudinal grooves, the first end part 7 of the locking clip 10 will not take up any forces in the axial direction, but only in the rotational direction.

The piston rod 5 has a threaded portion 30 which is adjacent to the end part 25 which has the notches 20. The threaded position 30 is intended to cooperate with the thread in the axial hole 3 in the piston 1. Being adjacent to the threaded portion 30 is a region which comprises a shoulder surface 35 which is intended to cooperate with a corresponding shoulder surface 40 on the piston 1. This co-operation occurs during the mounting of the piston 1 on the piston rod 5, when the piston 1 is screwed onto the piston rod 5 so far that the shoulder surfaces 35, 40 about each other. Subsequently, the piston 1 is unscrewed backwards so that the radial hole 15 in the piston 1 coincides with the first reached groove in the piston rod 5 that it meets.

As well as the first straight end part 7, the locking clip 10 also comprises a curved part 45 which is intended to cooperate with a circumferential groove 50 in the periphery of the piston. The locking clip 10 preferably has a circular cross-section with a radius which can correspond with the cross-sectional radius of the circumferential groove 50. The curved part 45 of the locking clip 10 can comprise one or more bent parts. In the embodiment according to claim 1, the locking clip 10 has a first, a second and a third bend 55, 60 resp. 65. In the locked position of the locking clip, parts of the first and second bends 55 resp. 60 are outside the circumferential groove 50. This permits dismantling of the locking clip 10 by a dismantling tool, e.g. a screw-driver, being introduced into a free space 66 between the locking clip 10 and the piston 1. The tool is introduced until it comes into contact with a first circumferential shoulder 70 (FIG. 2), whereafter the locking clip 10 is prized out of the circumferential groove 50 by leverage. When the locking clip 10 has partially been prized out of the circumferential groove 50, it may become necessary to change the purchase chase of the tool, whereby it is placed against a second circumferential shoulder surface face 75 on the piston 1, after which the disassembly can be completed.

The first, second and third bent parts 55, 60 resp. 65 have respectively a first, a second and a third bending radius. The second bending radius is greater than the third bending radius, and the third bending radius is greater than the first bending radius. According to the embodiment in FIG. 1, it is only the third bent part 65 which is in contact with the circumferential groove 50. It is, however, conceivable that also the second bent part 60 can be in contact at least partially with the circumferential groove 50.

The locking clip 10 has essentially a C-shape with an angle α of less than 180°.

Figure 3:
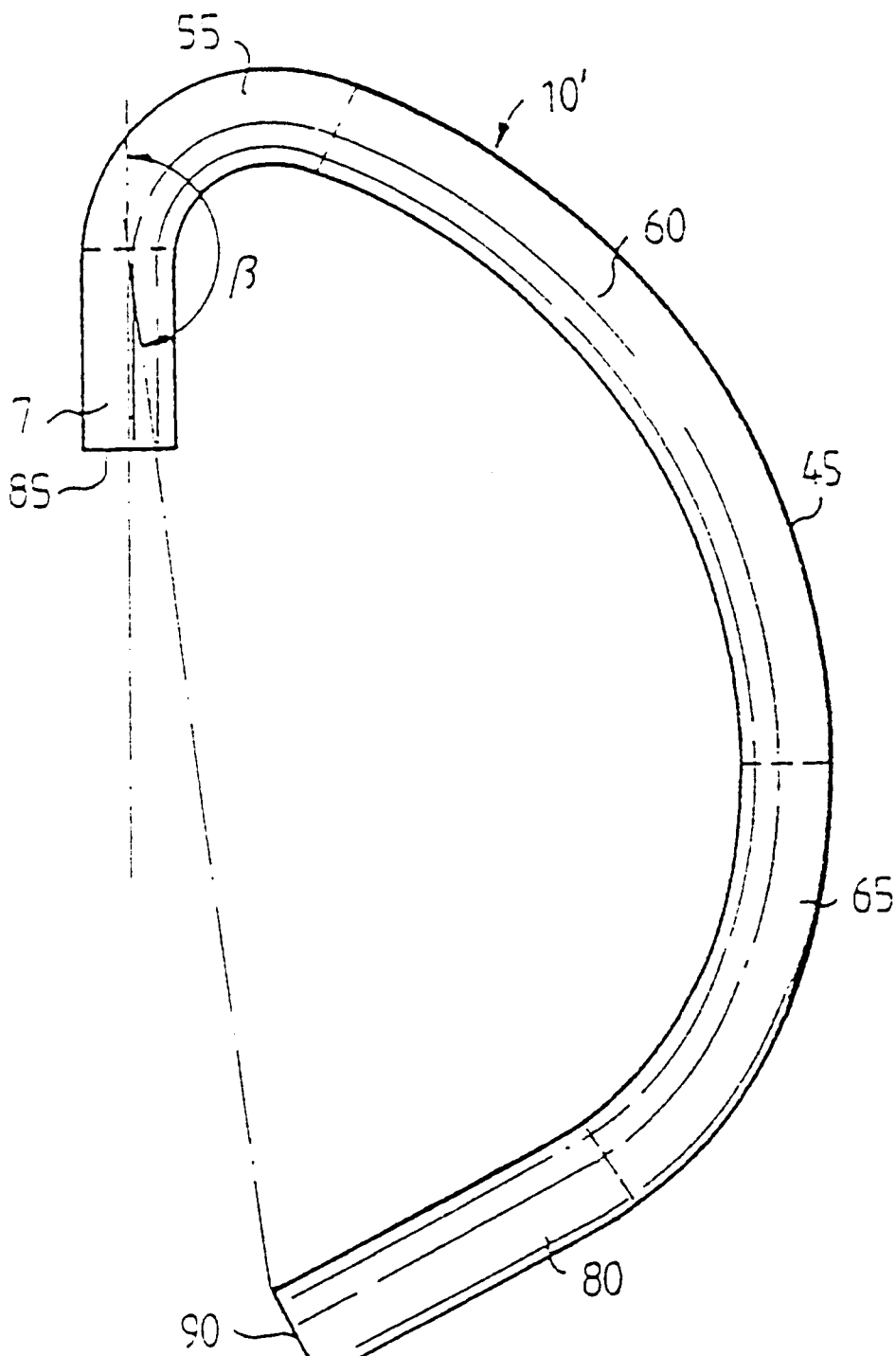
FIG. 3 shows a lateral view of a second embodiment of the locking clip according to the invention.

FIG. 3 shows an alternative embodiment of a locking clip 10' according to the invention. The locking clip 10' comprises, as well as a first straight end part 7, a curved part 45 and a second straight end part 80. The curved part 45 comprises a first, a second and a third bent part 55, 60 resp. 65 with respectively a first, a second and a third bending radius, wherein the first bent part 55 is adjacent to the first end part 7, the third bent part 65 is adjacent to the second end part 80 and the second bent part 60 is arranged between the first and third bent parts 55 and 65.

The second bending radius is greater than the third bending radius, and the third bending radius is greater than the first bending radius. The first end part 7 has a first end surface 85 and the second end part 80 has a second end surface 90, wherein the normal of the respective end surfaces 85, 90 cut each other at a point. The locking clip 10' has essentially a C-shape which describes an angle β of less than 180°.

During assembly of the locking clip 10, 10', the first straight end part 7 is introduced into the radially directed hole 15 in the piston 1 and into one of the notches 20 in the piston rod 5, with the clip lying essentially coincident with an axial plane through the centre line of the radial hole 15, whereafter the locking clip 10, 10' is swung around the centre axis of the radial hole 15. This is only possible in the case that the curved shape of the locking clip 10, 10' is less than 180°. By applying a mounting tool, e.g. a screwdriver, between the locking clip 10, 10' and the circumferential groove 50 in the piston 1, the locking clip 10, 10' can be prized into the circumferential groove 50.

The locking clip 10, 10' is preferably manufactured from spring steel but also other materials are conceivable, such as stainless steel, aluminium or polymer materials. The cross section of the locking clip 10, 10' is preferably round. Another cross-section is also conceivable.

The above embodiments concern a locking clip for locking a piston onto a piston rod. It is also conceivable to lock two or more randomly shaped bodies in relation to each other by means of a locking clip according to the invention. Such bodies could for example be formed of an internally threaded ring element on an externally threaded pin or spindle, such as a screw and nut.

I claim:

1. An arrangement for locking a piston onto a piston rod, comprising:

a piston with a peripheral groove and at least one radial through-hole having a center axis;

a piston rod with a notch;

said radial through-hole being located to be positionable over the notch in said piston rod; and a locking clip comprising a first straight end part and a curved part, said locking clip being constructed to have the first end part extend through the radial through-hole in said piston and into the notch in said piston rod, said locking clip having a C-shape with an angle α of less than 180°;

wherein, in a piston-locking position, a part of the curved part of said locking clip rests in the peripheral groove of said piston and a part of curved part of said locking clip positioned nearest to the first straight end part is outside the peripheral groove in the locking position of the clip, forming a free space between the locking clip and the piston, and wherein the C-shape of said locking clip permits said locking clip to swing around the center axis of the radial through-hole of said piston during assembly of said locking clip.

2. The arrangement of claim 1, wherein the locking clip comprises a second straight end part.

3. The arrangement of claim 1, wherein the piston has an axial hole, which axial hole is internally threaded and wherein the piston rod is provided with an externally threaded portion constructed to cooperate with the thread in the axial hole in the piston.

4. The arrangement of claim 2, wherein the curved part comprises a first, a second, and a third bent part with respectively a first, a second, and a third bending radius, wherein the first bent part is adjacent to the first end part, the third bent part is adjacent to the second end part, and the second bent part is arranged between the first and third bent parts.

5. The arrangement of claim 4, wherein the peripheral groove is a circumferential groove wherein one of the second end part of the locking clip is arranged to be resiliently forced in contact with the circumferential groove.

6. The arrangement of claim 1, wherein the piston rod comprises three notches as elongated grooves extending axially into the piston rod.

7. A locking clip for locking at least two bodies in relation to each other, the bodies having notches which can be placed in alignment with each other and one of the bodies having a peripheral groove, the locking clip comprising:

a first straight part constructed to be introduced into the notches in the respective bodies; and a curved part constructed to rest in the peripheral groove in a position mutually locking the two bodies together, wherein a part of the curved part of the locking clip situated closest to the first straight part is outside the peripheral groove in the locked position forming a free space between the locking clip and the one body having the peripheral groove, and wherein the locking clip has a C-shape with an angle of less than 180°, the C-shape permitting the locking clip to swing around a center axis of a radial hole of one of said bodies during assembly of the locking clip.

8. The locking clip of claim 7, wherein the locking clip further comprises a second straight end part, which together with the curved part describes an angle β of less than 180°.

9. The locking clip of claim 8, wherein the first end part, the curved part and the second end part lie in the one and the same plane.

10. The locking clip of claim 8, wherein each of the first end part, the curved part and the second end part have a round cross-section.

11. The locking clip of claim 8, wherein the curved part comprises a first, a second, and a third bent part with a respective first, second, and third bending radius, wherein the first bent part is adjacent to the second end part, the third part is adjacent to the second end part and the second bent part is arranged between the first and third bent parts.

12. The locking clip of claim 11, wherein the second bending radius is greater than the third bending radius, and wherein the third bending radius is greater than the first bending radius.

13. The locking clip of claim 7, wherein the locking clip is manufactured from one of a spring steel, stainless steel, aluminum and polymer material.

14. The locking clip of claim 7, wherein the bodies which are to be locked in relation to each other are a piston on a piston rod.

15. The locking clip of claim 7, wherein the bodies which are to be locked in relation to each other are an internally threaded ring-shaped element on an externally threaded pin or spindle.

16. A piston fastenable onto a piston rod, comprising:

a circular body with an axial through-hole for the introduction of a piston rod, the axial through-hole having an internal thread;

at least one radial through-hole positionable over a notch in the piston rod, and a circumferential groove lying in a same radial plane on said piston as the at least one radial through-hole, wherein at least one circumferential shoulder surface is formed axially near the circumferential groove, said shoulder surface constructed to bear a tool for disassembly of a locking clip with a first end part of the locking clip extending through the radial hole in the piston and into the notch of the piston rod and with a curved part of the locking clip resting in the circumferential groove in a piston-locking position.

* * * * *